(12) United States Patent
Berzin et al.

(10) Patent No.: US 8,081,611 B2
(45) Date of Patent: Dec. 20, 2011

(54) MOBILITY LABEL-BASED NETWORKS

(75) Inventors: Oleg L. Berzin, Huntingdon Valley, PA (US); Andrew G. Malis, Andover, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1117 days.

(21) Appl. No.: 11/863,489

(22) Filed: Sep. 28, 2007

(65) Prior Publication Data

US 2009/0022115 A1    Jan. 22, 2009

Related U.S. Application Data

(60) Provisional application No. 60/951,119, filed on Jul. 20, 2007.

(51) Int. Cl.
*H04Q 7/24* (2006.01)
(52) U.S. Cl. .................................... 370/338; 370/466
(58) Field of Classification Search .................. 370/338, 370/466, 342, 343, 389
See application file for complete search history.

(56) References Cited

U.S. PATENT DOCUMENTS

| | | | | |
|---|---|---|---|---|
| 7,269,135 B2* | 9/2007 | Frick et al. | ..................... | 370/228 |
| 7,561,586 B2* | 7/2009 | Wang et al. | ..................... | 370/401 |
| 7,848,321 B2* | 12/2010 | Akahane et al. | ............. | 370/389 |
| 2003/0118036 A1* | 6/2003 | Gibson et al. | ................. | 370/401 |
| 2004/0246957 A1* | 12/2004 | Grimminger | ................. | 370/389 |
| 2006/0072542 A1* | 4/2006 | Sinnreich et al. | ............. | 370/351 |
| 2006/0268934 A1 | 11/2006 | Shimizu | | |
| 2007/0076732 A1* | 4/2007 | Kim | ............................... | 370/409 |
| 2008/0031208 A1* | 2/2008 | Abhishek et al. | ............. | 370/338 |

FOREIGN PATENT DOCUMENTS

| | | |
|---|---|---|
| CA | 2292252 | 12/1999 |
| WO | 03/030467 | 10/2003 |

OTHER PUBLICATIONS

Chen et al., "Effect of the Label Management in Mobile IP Over MPLS Networks", Proceedings 17th International Conference on Advanced Information Networking and Applications, Mar. 27-29, 2003, pp. 379-384.
Chiussi et al., "Mobility Management in Third-Generation AII-IP Networks", IEEE Communications Magazine, vol. 40, Issue 9, Sep. 2002, pp. 124-135.
"IP Mobility Support for IPv4," RFC 3344, C. Perkins, Network Working Group, Aug. 2002, The Internet Society 2002, 83 pages.
"BGP/MPLS VPNs," E. Rosen et al., RFC 2547, Mar. 1999, 24 pages.
"Protocols for Mobile Internetworking," J. Ioannidis, Ph. D. Thesis, Columbia University, 1993, 204 pages.
"M-MPLS: Micromobility-enabled Multiprotocol Label Switching," V. Vassiliou et al., IEEE Publication, 2003, pp. 250-255.
"Integration of Mobile IP and Multi-Protocol Label Switching," Z. Ren et al., 5 pages.
"A Network Architecture for MPLS Based Micro-Mobility," F.A. Chiussi et al., Wireless Communications and Networking Conference, IEEE, vol. 2, Mar. 2002, pp. 549-555.

(Continued)

*Primary Examiner* — Chuong T Ho

(57) ABSTRACT

A device may receive a discovery signal from a mobile node, register the mobile node in response to receiving the discovery signal from the mobile node, assign a mobility label to the mobile node after the registration, distribute messages describing the mobility label and the mobile node to edge routers in the network to create a label switched path, and route communication messages from a remote node to the mobile node along the label switched path in the network.

18 Claims, 6 Drawing Sheets

OTHER PUBLICATIONS

"An Approach for Mobility Modeling—Towards an Efficient Mobility Management Support in Future Wireless Networks," R. Langar et al., IEEE, 2006, pp. 316-326.

"Carrying Label Information in BGP-4," Y. Rekhter et al., RFC 3107, The Internet Society, May 2001, 8 pages.

"Multiprotocol Extensions for BGP-4," T. Bates et al., RFC 2858, The Internet Society, Jun. 2000, 9 pages.

"Cellular IP—A New Approach to Internet Host Mobility," A. G. Valko, ACM Computer Communication Review, Jan. 1999, 16 pages.

"Mobility Support in Label Switched Networks with Multi-Protocol BGP," O. Berzin, Verizon Communications, Jun. 5, 2007, pp. 1-11.

"Mobility Support Using MPLS and MP-BGP Signaling," O. Berzin, MPLS and Ethernet World Congress 2008 Contribution Proposal, Verizon Communications, Philadelphia, PA, Jul. 19, 2007, 3 pages.

* cited by examiner

MOBILITY LABEL-BASED NETWORKS

RELATED APPLICATIONS

This application claims priority under 35 U.S.C. §119 based on U.S. Provisional Patent Application No. 60/951,119, filed Jul. 20, 2007, the disclosure of which is incorporated by reference herein in its entirety.

BACKGROUND

In a Mobile Internet Protocol (IP) network, a mobile node (MN) may enter a foreign subnet, discover a foreign agent (FA) node by listening to Internet Control Message Protocol (ICMP) messages, and register itself with the FA node and a home agent (HA) node. The FA agent node may include a router coupled to the subnet near which the MN is currently located, and the HA node may include a router coupled to the original home subnet to which the MN is assigned.

Upon successful registrations, a remote node, which intends to communicate with the MN, may send messages to the HA, which then may encapsulate and tunnel the messages to the FA. The FA may recover the messages from the tunnel encapsulation and relay the messages to the MN using a layer 2 delivery network. In the reverse direction, the messages from the MN may be sent directly to the remote node.

DETAILED DESCRIPTION OF PREFERRED EMBODIMENTS

The following detailed description refers to the accompanying drawings. The same reference numbers in different drawings may identify the same or similar elements.

The term "edge router," as used herein, may refer to a router that is placed at the edge of a network.

As used herein, the term "mobility label" may refer to a Multi-Protocol Label Switched (MPLS) label that designates a mobile host or a router that relays packets to and/or from the mobile host.

As used herein, the term "overlay service," may refer to a service that employs another service to provide the service.

Figure 1:
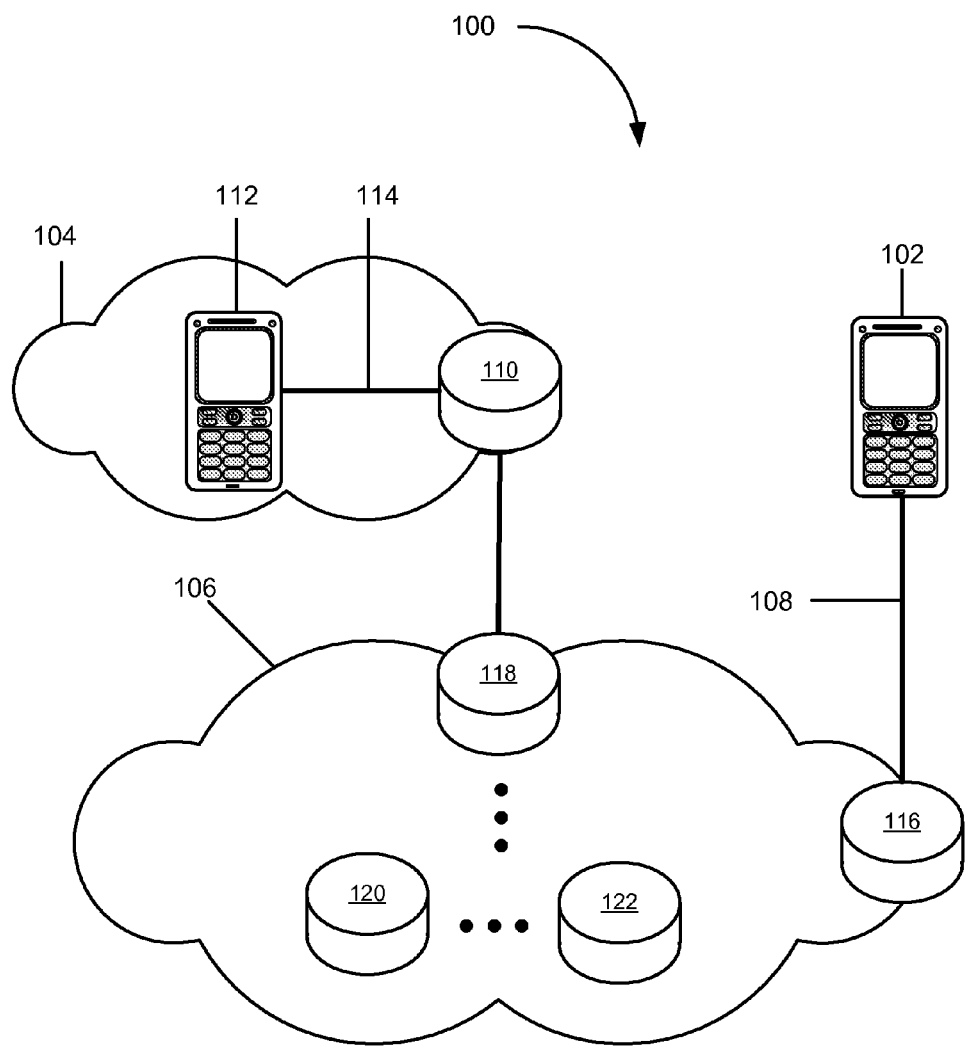
FIG. 1 is a diagram of an exemplary network in which the concepts described herein may be implemented.

FIG. 1 is a diagram of an exemplary mobility label-based network (MLBN) 100 in which concepts described herein may be implemented. As shown, MLBN 100 may include a mobile node 102, a customer network 104, an Internet Protocol (IP)/Multi-Protocol Label Switched (MPLS) network 106, and a communication link 108. Depending on implementation and/or operation, MLBN 100 may include fewer, additional, or different components than those illustrated in FIG. 1.

Mobile node 102 may include any of the following devices: a mobile router; a mobile computer; an electronic notepad or a laptop; a mobile telephone, such as a radio telephone; an IP phone; a personal communications system (PCS) terminal; a personal digital assistant (PDA); a pager; and/or any other type of communication device with that can participate in a wireless or wire-line network communication.

Customer network 104 may include one or more of various types of networks, such as a layer 3 IP network, a legacy network for providing native network services based on technologies such as, for example, Ethernet, ATM (asynchronous transfer mode), Frame Relay, and/or Time-division Multiplexing (TDM), etc. As further shown in FIG. 1, customer network 104 may include customer edge (CE) router 110, a mobile node 112, and a communication link 114. CE router 110 may include a router located in customer premises and may provide an entry into and/or an exit from customer network 104. Mobile node 112 may include a device similar to mobile node 102. Communication link 114 may provide a wireless and/or wire-line channel via which mobile node 112 may communicate via CE router 110.

IP/MPLS network 106 may include devices and/or systems that provide routing/switching of packets based on router identifiers, known as labels, and/or IP addresses. As shown in FIG. 1, IP/MPLS network 106 may include a Label Edge (LE) router 116, a LE router 118, a Label Switch (LS) router 120, and a LS router 122. LE router 116/118 may include a router that may provide an entry and/or an exit to and from IP/MPLS network 106. LS routers 120/122 may include a router that accepts IP/MPLS packets and routes them toward their destination devices through IP/MPLS network 106. Communication link 108 may provide a wireless and/or wire-line channel via which mobile node 102 may communicate with a via LE router 116.

In FIG. 1, when mobile node 102/112 moves to a particular geographical location, mobile node 102/112 may perform a search for a device/router that provides a Mobility Support Function (MSF), which will be described below in detail. Assuming for the moment that both CE router 110 and LE router 116 provide the MSF, if mobile node 102/112 is able to locate either CE router 110 or LE router 116, mobile node 102/112 may register itself with CE router 110 or LE router 116.

Once the registration process is complete, edge routers (e.g., CE router 110, LE router 116, LE router 118, etc.), may exchange routing information for mobile node 102/112 based on a routing protocol (e.g., Multi-Protocol Border Gateway Protocol (MP-BGP)). More specifically, an IP address and a mobility label associated with a mobile node 102/112 may be exchanged between the edge routers. Upon the completion of the exchange, mobile node 102/112 may communicate with another node over MLBN 100.

In FIG. 1, MLBN 100 may obtain scalability and efficiency in mobile communication by simplifying registration processes and routing paths. For example, in MLBN 100, mobile node 102/112 may register with a single node that provides the MSF. By contrast, in a Mobile IP network, a mobile node may need to register with a Home Agent (HA) router and a Foreign Agent (FA) router before the mobile node can employ transport services that are provided by the Mobile IP network. The registration process in MLBN 100 also eliminates the need for Care-of-Addresses used in Mobile IP to represent the location of a mobile node 102/112 in the network. In addition, in MLBN 100, after the registration, messages from a remote node to mobile node 102 may be routed directly from the remote node to mobile node 102. By contrast, in the Mobile IP network, messages from a remote node may be first routed to the HA router before they are redirected to the mobile node. This "triangular routing" may cause unnecessary delays and other impairments such as packet loss and jitter in the communications path between a mobile node and a correspondent node. In addition, MLBN 100 eliminates the requirement for tunneling of IP packets by the HA router, which may further improve the performance of the mobile communications.

Figure 2:
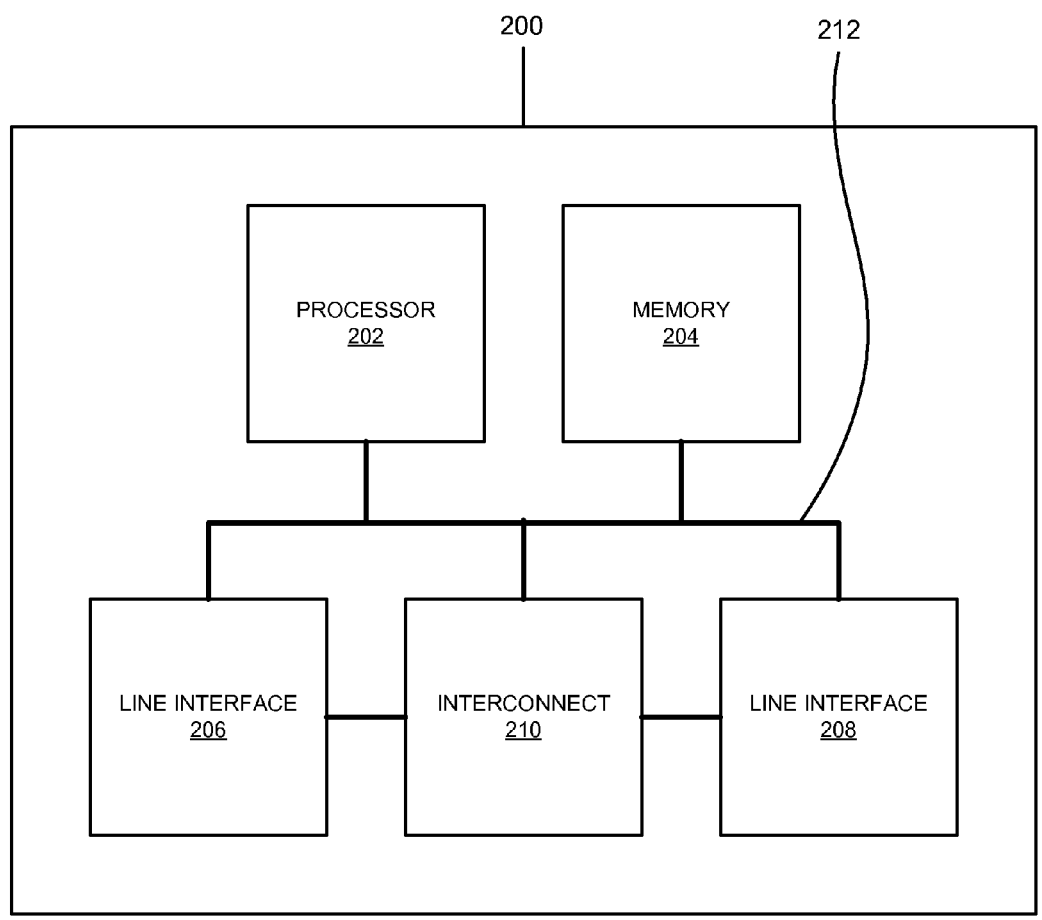
FIG. 2 is a block diagram of an exemplary network device of FIG. 1.

FIG. 2 is a block diagram of a network device 200, which may correspond to one or more of CE router 110, LE routers 116-118, or LS routers 120-122. As shown, network device 200 may include a processor 202, a memory 204, line interfaces 206-208, an interconnect 210, and communication paths 212. In different implementations, network element 200 may include additional, fewer, or different components than the ones illustrated in FIG. 3. For example, network device 200 may include additional line interfaces.

Processor 202 may include one or more processors, microprocessors, and/or processing logic optimized for networking and communications. Processor 202 may process packets and/or network path-related information. Memory 204 may include static memory, such as read only memory (ROM), dynamic memory, such as random access memory (RAM), and/or onboard cache, for storing data and machine-readable instructions. In some implementations, memory 204 may also include storage devices, such as a floppy disk, a CD ROM, a CD read/write (R/W) disc, and/or flash memory, as well as other types of storage devices.

Line interfaces 206 and 208 may include components for receiving incoming packets from devices and/or elements in MLBN network 100 and for transmitting packets to other devices/elements in MLBN network 100. Interconnect 210 may include switches for conveying a packet from line interface 206 to line interface 208, and vice versa. Examples of interconnect 210 may include a communication bus or a switch fabric. Communication paths 212 may provide an interface through which components of network device 200 can communicate with one another.

Figure 3:
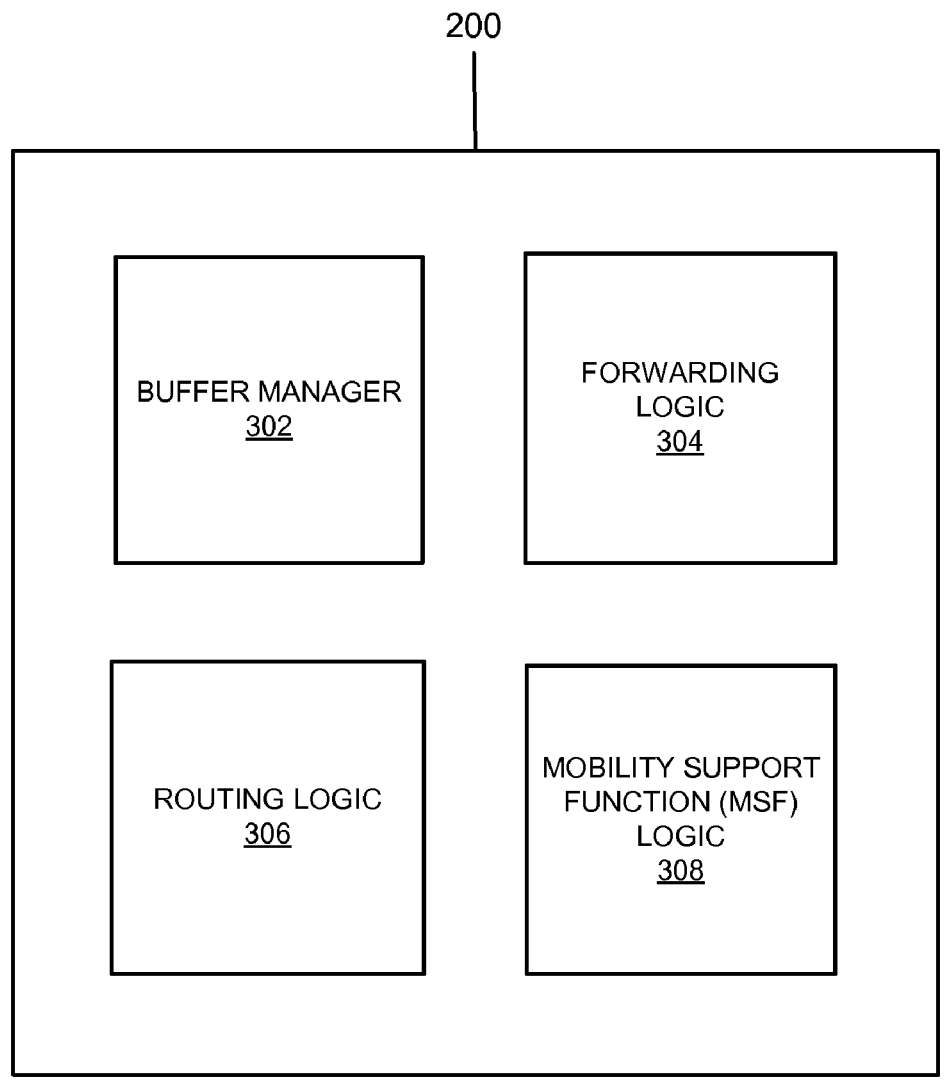
FIG. 3 is a functional block diagram of the exemplary network device of FIG. 1.

FIG. 3 is a functional block diagram of exemplary network device 200. As shown, network device 200 may include a buffer manager 302, forwarding logic 304, routing logic 306, and Mobility Function Support (MSF) logic 308. Depending on implementation, network device 200 may include fewer, additional, or different components than those illustrated in FIG. 3. For example, if network device 200 is implemented as LS router 120/122, network device 200 may not necessarily include MSF logic 308.

Buffer manager 302 may provide a buffer for queuing incoming packets and information about the packets. If packets arrive simultaneously, one or more of the packets may await in the buffer until higher priority packets are processed and/or transmitted.

Forwarding logic 304 may include hardware and/or software for routing packets toward their destination devices through MLBN 100. Within IP/MPLS network 106 part of MLBN 100, a network path that a packet follows as the result of being routed by forwarding logic 304 in various routers may be known as a label switched path (LSP). To route a packet along the LSP, forwarding logic 304 may direct a packet to a proper output port on a line interface of network device 200 based on the packer header.

In addition to forwarding the packet, forwarding logic 304 may perform various procedures on the packet header, depending on whether its host router is implemented as LE router 116/118 or LS router 120/122. If the host router is implemented as LE router 116/118, forwarding logic 304 may convert a packet that enters IP/MPLS network 106 into a MPLS packet, by adding a MPLS header to the packet. In addition to the outer MPLS label that identifies the next LS router that the LSP must take towards the destination endpoint of the LSP (another LE router) the MPLS header may include another (stacked) MPLS label (e.g., a mobility label) that identifies the mobile host registered at the originating LE router by the serving MSF logic 308. Conversely, forwarding logic 304 may convert a MPLS packet that exits IP/MPLS network 106 by stripping away its MPLS header including both the outer label and the mobility label.

If the host router operates as LS router 120/122, forwarding logic 304 may perform an operation on the MPLS header (e.g., a mobility label) of a received packet. The operation may include creating another MPLS label and inserting it next to the original MPLS label, swapping the MPLS label for another MPLS label, and/or removing the MPLS label and/or the MPLS header. Because an outermost MPLS label in the MPLS header may designate the next-hop router, an operation that affects the label may also modify the identity of the next-hop router.

Routing logic 306 may include hardware and/or software for communicating with other routers to gather and store routing information. Routing logic 306 may enforce a specific set of procedures for communicating routing messages (e.g., label distribution protocol (LDP), constraint-based routing LDP, MP-BGP, etc.) about router destinations (e.g., labels, IP addresses, etc.). Through the exchange of the routing messages, network device 200 may manage routing information in network device 200's forwarding tables, by which participating CE, LE, and LS routers in MLBN 100 may abide.

In managing routing information, routing logic 306 may provide a function that can be viewed as an inter-domain control plane that overlays a MPLS control/forwarding plane. The inter-domain control plane may be responsible for the inter-domain network distribution and management of MPLS labels (e.g., mobility labels) that are assigned to mobile nodes. The MPLS control/forwarding plane may be responsible for propagating MPLS labels to establish a network route/path (e.g., LSP) within IP/MPLS network 106.

In providing the inter-domain control plane functions, routing logic 306 may employ an inter-domain routing/signaling protocol to exchange messages with other edge routers, such as CE router 110, LE router 116, and LE router 118. The messages may include information related to mobile routers (e.g., network level reachability information (NLRI)). For example, MP-BGP may be used to propagate mobility labels to LE routers 116-118 or other edge routers that are outside of IP/MPLS network 106.

If MP-BGP is used to distribute the information related to mobile nodes to the edge routers (e.g., LE routers 116-118, etc.), NLRI that originates from a source LE router may be carried by fields in MP-BGP messages that are propagated for updating routes. Furthermore, the fields may include an IP address that belongs to the source LE router. LS router 120/122 in IP/MPLS network 106 may not need to be aware of NLRI.

In providing the MPLS control/forwarding functions, routing logic 306 may exchange routing messages (e.g., MP-BGP messages, LDP messages, RSVP messages, etc.) with other LE routers in IP/MPLS network 106. The routing messages may include information about MPLS labels and about packet classes, each of which may be associated with a MPLS label (e.g., mobility label). For example, at LE router 116, a class that represents a mobility class into which a packet to/from mobile node 102 is categorized may be associated with a mobility label. By exchanging information about the MPLS mobility labels and the packet classes with other LE routers, LE router 116/118 may permit other LE routers in IP/MPLS network 106 to establish a LSP for a packet to/from mobile node 102.

MSF logic 308 may include hardware and/or software for supporting mobile node 102/112. As further described below, MSF logic 308 may permit mobile node 102/112 to discover a node that includes MSF logic 308 and register mobile node 102/112 at the node; may associate/de-associate an IP address or a prefix of the mobile node with a mobility label; may use a tolerance level of mobile node 102/112 to network disruptions during a device hand-off; and may propagate routing information for mobile node 102/112 across inter-domain routers (e.g., CE router 110, LE router 116/118, etc.).

MSF logic 308 may permit mobile node 102/112 to discover a node that includes MSF logic 308 (e.g., CE router 110, LE routers 116/118, etc.) and register itself at the node. Mobile node 102/112 may initiate the discovery by sending a layer 2 multicast discovery signal or a solicitation message. Upon discovery of the node with MSF logic 308, mobile node 102/112 may thereupon register itself at the node, by sending a series of messages to the node. The messages may convey various networking parameters, such as an identifier for mobile node 102/112, an IP address, a priority level of transport service, etc.

MSF logic 308 may associate and de-associate (e.g., bind/unbind) an IP address or a prefix for a range of IP addresses of mobile node 102/112 with a mobility label. In one implementation, the range of IP addresses may be pre-allocated for mobile nodes, to be associated with mobility labels. This range may not need to be flat and may be sub-netted. In another implementation, the IP address may be dynamically identified by a mobile node 102/112 and associated with a mobility label. In both cases the mobile nodes will dynamically register their assigned IP addresses with the MSF logic 308. The association between an IP address or a prefix for a group of IP addresses and a mobility label may be made when mobile node 102/112 identifies itself as a mobile host or a mobile router.

MSF logic 308 may use a tolerance level that is provided by mobile node 102/112. During the registration, an application in mobile node 102 may send messages to MSF logic 308 to indicate the level of tolerance to a disruption that is caused by the network handling of a hand-off process. MSF logic 308 may encode the tolerance level in routing messages that are sent from network device 200 to other edge routers. At the other edge routers in MLBN 100, the tolerance level may be used to control the priority in processing the routing messages. For example, a mobile host running a real time interactive application may be given a higher processing priority over a mobile host that is running an asynchronous message passing application (e.g., a message-oriented middleware (MOM)).

MSF logic 308 may propagate routing information for mobile node 102/112 across inter-domain routers. In one implementation, MSF logic 308 may employ routing logic 306, which in turn, may employ MP-BGP to propagate the routing information. In such an implementation, MSF logic 308 may cause routing logic 306 to use a specific messaging format (e.g., Address Family (AF) field structure in MP-BGP messages).

Figure 4A:
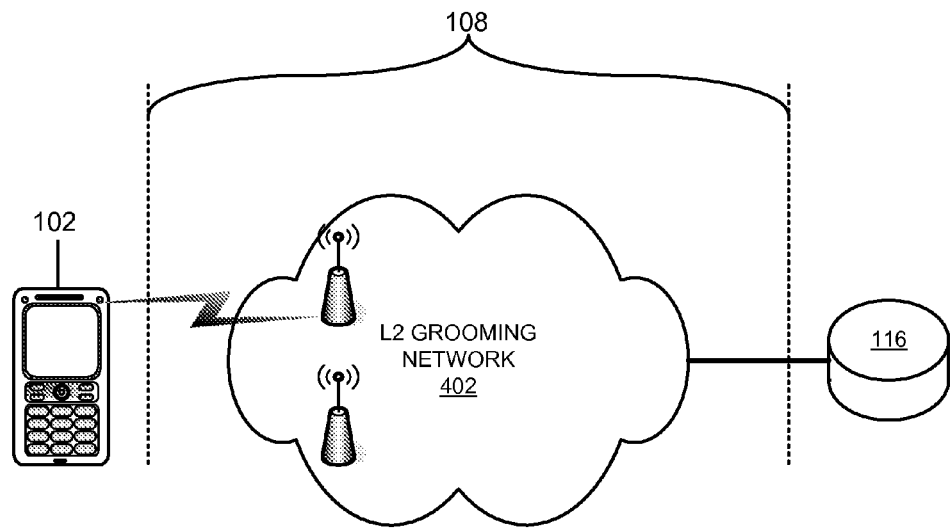
FIG. 4A is a diagram of an exemplary communication link of FIG. 1.

FIG. 4A is a diagram of communication link 108. As illustrated, communication link 108 may include layer 2 (L2) grooming network 402, also known as a Radio Access Network (RAN). L2 grooming network 402 may aggregate signals from one or more wireless access points and send the aggregated signals to LE router 116.

In FIG. 4A, mobile node 102 is illustrated as being directly attached to LE router 116. The term "directly attached" or "direct attachment," as used herein, may indicate that a direct layer 2 path exist between a mobile node and a MSF logic-enabled LE router, either via an integrated radio interface or via a wire-line grooming network.

The direct attachment may be suitable in cases where mobility support is offered as a service that overlays a MPLS transport service in IP/MPLS network 106. An example of such a service may include a wireless telephone service with data or multi-media capabilities (e.g., Evolution-Data Optimized (EV-DO)), in which mobility management is handled by a MSF-logic enabled MPLS network. Mobile nodes may include wireless telephone sets with Internet Protocol Version 4 (IPv4) or IP Version 6 (IPv6) stacks and corresponding addresses that are assigned by the service provider, communicating via RAN base stations to the MSF logic-enabled LE router. In the direct attachment, a simple registration procedure may trigger assignment of mobility labels to the wireless telephone sets and the subsequent propagation of routing information to other edge routers within the MSF-logic enabled network.

Figure 4B:
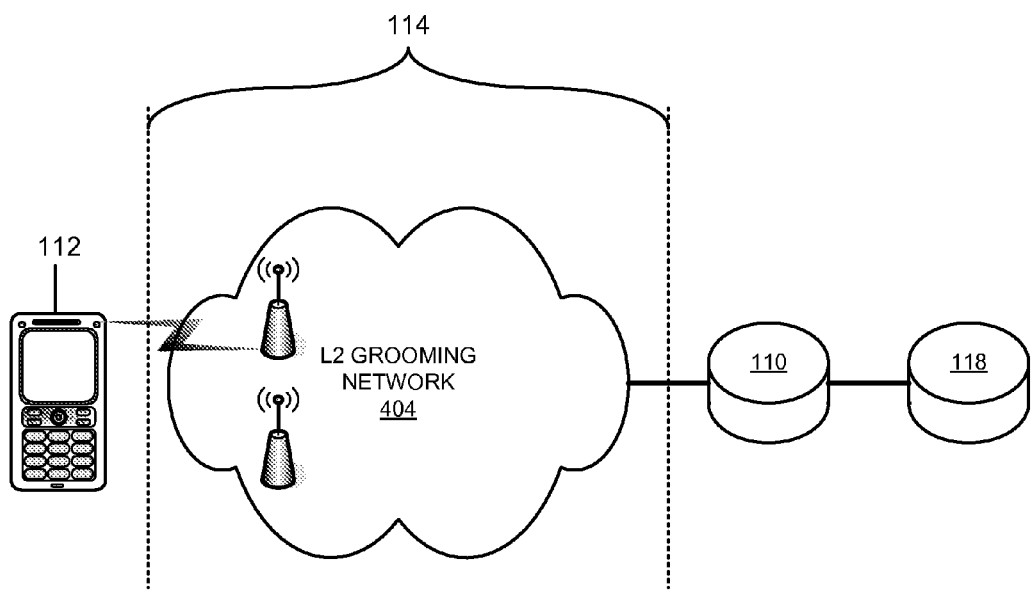
FIG. 4B is a diagram of another exemplary communication link of FIG. 1.

FIG. 4B is a diagram of communication link 114. As illustrated, communication link 114 may include layer 2 (L2) grooming network 404, which may aggregate signals from one or more wireless access points and send the aggregated signals to CE router 110.

In FIG. 4B, mobile node 112 is illustrated as being indirectly attached to LE router 118 through CE router 110. The term "indirectly attached" or "indirect attachment," as used herein, may indicate that there is no direct layer 2 path between a mobile node and a MSF logic-enabled LE router; and that there is one or more layer 3 device (e.g., CE router 110) between the MSF logic-enabled LE router and the RAN to which the mobile node may be linked.

The indirect attachment may be suitable in cases where the mobility service is integrated with other MPLS services, such as layer 3 Virtual Private Network (VPN) service. An example of such a service may include enterprise networking, where mobiles nodes can be wireless workstations or wireless IP telephones, and enterprise sites connect to the service provider's mobility enabled MPLS network via CE routers. The CE routers may include MSF logic 308 and may employ an inter-domain routing/signaling protocol to exchange information about mobility labels between the CE routers and the LE router.

In the same example, because there is no LS router between the CE router and the LE router, using the inter-domain routing protocol and MPLS protocol for forwarding packets to mobile nodes may eliminate a need to logically merge the CE routers with the service provider's LE/LS routers within IP/MPLS network 106 to service mobile node 102/112. The LE router, however, may still need to accept, from the CE routers, information that associates the mobility labels with mobile nodes via the inter-domain routing/signaling protocol and propagate the information into IP/MPLS network 106 using the layer 3 VPN service.

Direct attachment or indirect attachment may occur in different network configurations. In one network configuration, two or more different interconnecting networks may share the management of a mobile node. In such an implementation, participating networks may all implement MSF logic 308.

In another network configuration, all mobility functions may be managed by a service provider's network (e.g., IP/MPLS network 106). In such a configuration, an interface to other networks may be implemented by a peering gateway node that connects the MPLS network to the rest of the world. There may be no need to extend MPLS processing beyond the interface, since all mobility IP addresses belong to the IP address space of the service provider. A general peering arrangement to other networks where the IP address range of the service provider is advertised to the Internet may enable the mobile nodes to communicate with remote nodes that are outside of the MPLS network.

Figure 5:
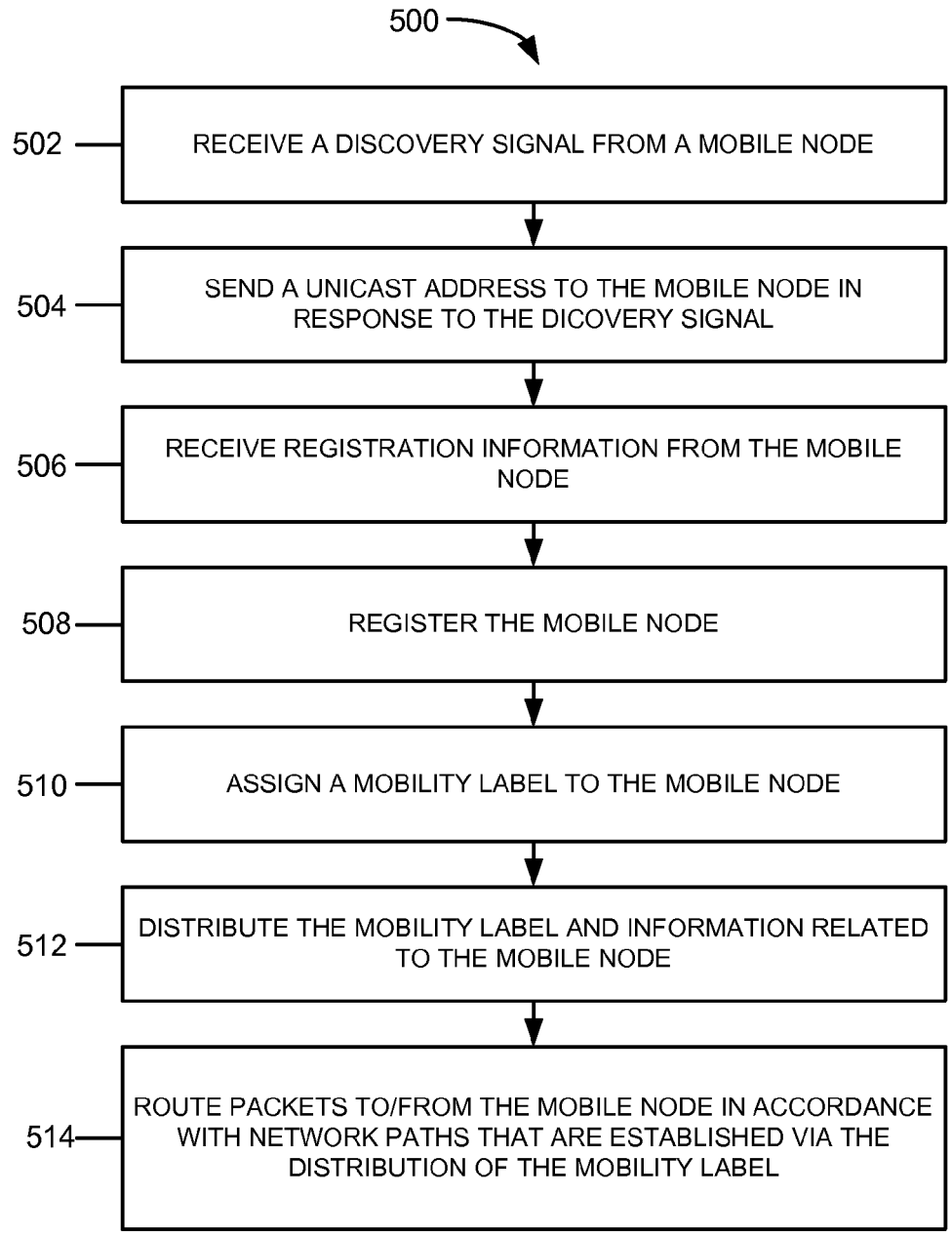
FIG. 5 is a flow diagram of an exemplary process for communicating over a mobility label-based network.

The above paragraphs describe system elements that are related to devices and/or components in mobility label-based networks. FIG. 5 shows an exemplary process 500 that is capable of being performed by one or more of these devices and/or components.

Process 500 may begin at block 502, where discovery signals from mobile node 102/112 may be received at MSF logic 308. The discovery signals may include multicast messages. MSF logic 308 may be hosted in either a LE router or a CE router, depending on whether the network that includes the host router supports a direct or indirect attachment.

MSF logic 308 may send a unicast address to mobile node 102/112 in response to the discovery signal (block 504). This unicast address may be a virtual IP address supported on multiple logical interfaces of the LE router that are under control of the MSF logic 308. The unicast address may be received by mobile node 102/112, which in turn may respond with registration information (e.g., IP address).

The registration information may be received at MSF logic 308 (block 506). At block 508, mobile node 102/112 may be registered based on the registration information. The registration may entail recording an identifier (e.g., IP address, or some form of identification information) for mobile node 102/112 in a table, set, list, and/or other types of data structure for keeping track of nodes that require support from MSF logic 308.

A mobility label may be assigned to mobile node 102/112 (block 510). The assignment may involve associating an identifier for mobile node 102/112 with the mobility label. The identifier may be obtained from the registration information.

The mobility label and information (e.g., identifier) related to mobile node 102/112 may be distributed to one or more routers (block 512). If MSF logic 308 is hosted by CE router 110 or LE router 116, MSF logic 308 may cause its routing logic 306 to send the mobility label and the information related to mobile node 102/112 to other edge routers based on an inter-domain routing/signaling protocol. For example, MSF logic 308 may cause routing logic 306 to package the mobility label and the information as part of NLRI in an AF within MP-BGP messages and send the MP-BGP messages to LE routers 116 and 118. If MSF logic 308 is hosted by LE router 116, MSF logic 308 may cause routing logic 306 to send the messages to other LE routers of the IP/MPLS network 106 based on other signaling protocols, such as MP-BGP, LDP or RSVP.

Packets to/from mobile node 102/112 may be routed in accordance with network paths that are established via the distribution of the mobility label (block 514) and the outer labels identifying the path between the LE routers. Distributing labels in MLBN 100 through the inter-domain routing/signaling protocol and MPLS signaling protocol may determine a LSP for packets that are forwarded to or originate from mobile node 102/112. Once the mobility label for mobile node 102/112 is propagated within MLBN 100, mobile node 102/112 may communicate with another device or node in MLBN 100.

Figure 6:
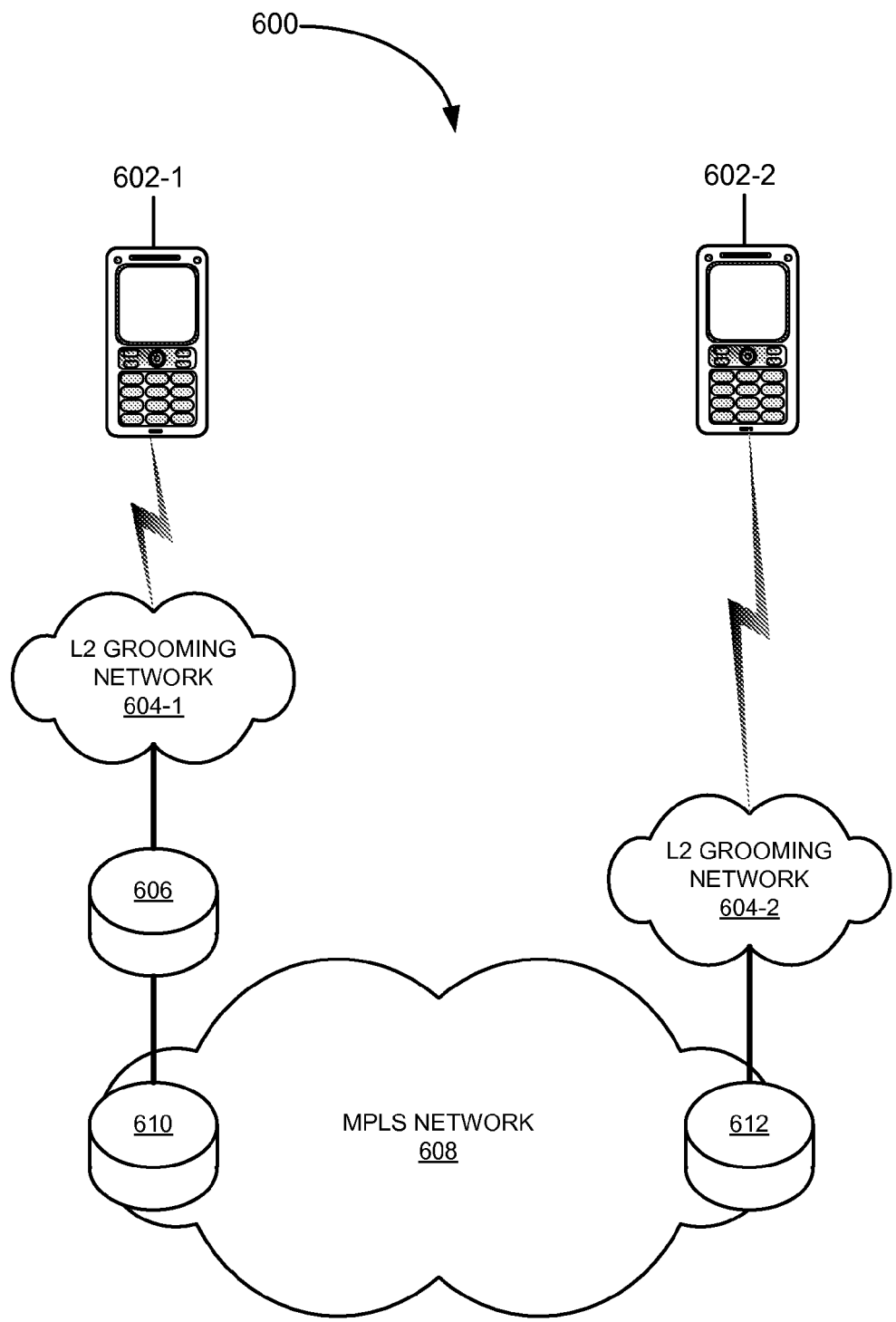
FIG. 6 illustrates an exemplary flow of a packet in a mobility label-based network.

The following example, with reference to FIG. 6, illustrates a process for communicating in a mobility label-based network. The example is consistent with the exemplary process described above with reference to FIG. 5.

In the example, as illustrated in FIG. 6, assume MLBN 600 includes a mobile IP phone 602-1 and a mobile IP phone 602-2, a RAN 604-1, a RAN 604-2, a CE router 606, and a MPLS network 608. Assume that MPLS network 608 includes LE routers 610 and 612. Also, assume that each of CE router 606 and LE router 612 includes MSF logic 308.

When a mobile IP phone 602-1 is in RAN 604-1, mobile IP phone 602-1 sends a discovery signal to CE router 606 via RAN 604-1. In response, CE router 606 sends a unicast address to mobile IP phone 602-1. Mobile IP phone 602-1 responds by sending registration information to CE router 606. CE router 606 receives the registration information and registers mobile IP phone 602-1. Mobile IP phone 602-1 forms an indirect attachment to LE router 610 via RAN 604-1 and CE router 606.

After the registration, CE router 606 associates a mobility label with mobile IP-phone 602-1, and propagates the mobility label and information related to mobile IP-phone 602-1 to LE router 610 based on MP-BGP. In turn, LE router 610 sends the mobility label and the information to LE router 612 based on MP-BGP. Both LE router 610 and LE router 612 propagate the mobility label to other LE routers of MPLS network 608 via MP-BGP messages.

When a mobile IP phone 602-2 is in RAN 604-2, mobile IP phone 602-2 sends a discovery signal to LE router 612 via RAN 604-2. In response, LE router 612 sends a unicast address to mobile IP phone 602-2. Mobile IP phone 602-2 responds by sending registration information to LE router 612. LE router 612 receives the registration information and registers mobile IP phone 602-2, forming a direct attachment to mobile IP phone 602-2 via RAN 604-2. After the registration, LE router 612 associates a mobility label with mobile IP-phone 602-2 and propagates the mobility label and information related to mobile IP phone 602-2 to LE router 610 based on MP-BGP. Both LE router 610 and LE router 612 propagate the mobility label to other LE routers of MPLS network 608 via MP-BGP messages.

Once the mobility labels for mobile IP-phone 602-1 and mobile IP-phone 602-2 are distributed over routers in network 600, a mobile IP-phone 602-1 user may communicate with a mobile IP phone 602-2 user over network 600. This communication is accomplished via the use of the MPLS label stack that consists of an outer label identifying the path between the LE routers 610 and 612 via a set of LS routers internal to the IP/MPLS network 608, and the mobility label identifying the mobile IP phones 602-1 and 602-2 in the data structures of the MSF logic 308 in the respective LE routers 610 and 612.

In the above example, MLBN 600 may obtain scalability and efficiency in mobile communication by simplifying a registration process and routing paths. For example, in MLBN 600, each of mobile IP phones 602-1 and 602-2 may register with a single node that provides MSF. In a different type of network, a mobile node may need to register with a Home Agent (HA) router and a Foreign Agent (FA) router before the mobile node can employ transport services that are provided by the network. The registration process in MLBN 600 also eliminates the need for Care-of-Addresses used in Mobile IP to represent the location of a mobile node 102/112 in the network.

In addition, in MLBN 600, after the registration, messages from mobile IP phone 602-1 may be routed directly to mobile IP phone 602-2. In another type of network, messages from a remote node may be first routed to a HA router before they are redirected to the mobile node. This "triangular routing" may cause unnecessary delays and other impairments such as packet loss and jitter in the communications path between a mobile node and a correspondent node. In addition, MLBN 600 eliminates the requirement for tunneling of IP packets by the HA router, which may further improve the performance of the mobile communications.

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIG. 5, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
  receiving, at a mobility support function (MSF) logic-enabled first edge router in a network including a plurality of label switch (LS) routers, a discovery signal from a first mobile node;
  registering the first mobile node in response to receiving registration information related to the discovery signal, from the first mobile node, wherein the registration information includes first data including at least one networking parameter for the first mobile node;
  assigning a mobility label to the first mobile node, including associating the first data with the mobility label;
  distributing, in accordance with a multi-protocol border gateway protocol, messages describing the mobility label and the first data to a plurality of edge routers including an MSF logic-enabled second edge router, in the network to create a label switched path; and
  routing communication messages to be exchanged between the first mobile node and a second mobile node, along the label switched path in the network.

2. The method of claim 1, further comprising:
  sending a unicast address to the first mobile node in response to the discovery signal.

3. The method of claim 1, wherein receiving the discovery signal includes:
  receiving the discovery signal from the first mobile node indirectly through a communication path that includes a layer 3 device not within the network.

4. The method of claim 1, wherein registering the first mobile node includes one of:
  registering a mobile router; or
  registering a mobile host.

5. The method of claim 1, wherein distributing messages includes:
  distributing the messages to the plurality of edge routers in accordance with an inter-domain signaling protocol.

6. The method of claim 1, further comprising at least one of:
  distributing the mobility label in accordance with a label distribution protocol; or
  distributing the mobility label in accordance with a resource reservation protocol.

7. The method of claim 1, where wherein distributing messages includes:
  creating messages that include network level reachability information; and
  sending the messages that include the network level reachability information to the plurality of edge routers.

8. The method of claim 1, where wherein distributing messages includes:
  sending the messages from a customer edge router at which the first mobile node is registered and is not in the network.

9. The method of claim 1, wherein assigning a first mobility label includes:
  associating a multi-protocol label switching label with the first mobile node.

10. A device comprising:
  a mobility support function (MSF) module to:
    exchange a plurality of messages with a first mobile node responsive to receiving a discovery signal from the first mobile node,
    register the first mobile node in response to receiving registration information included in at least one message of the plurality of messages, wherein the registration information includes first data related to at least one networking parameter for the first mobile node, and
    link the first mobile node to the device via a communication path; and
  a routing module to:
    propagate a mobility label, associated with the first data, from the device to a plurality of edge routers including an MSF logic-enabled edge router, in a network, in accordance with an inter-domain signaling protocol that includes a multi-protocol border gateway protocol, and
    distribute the mobility label to routers that are within a multi-protocol label switching (MPLS) network portion of the network, in accordance with a distribution protocol.

11. The device of claim 10, wherein the communication path includes:
  an indirect link through a layer 3 device to the first mobile node via a radio access network.

12. The device of claim 11, wherein the layer 3 device comprises a customer edge router.

13. The device of claim 10, wherein the plurality of messages include at least one of:
    a solicitation message from the first mobile node; or
    a registration message from the first mobile node.

14. The device of claim 10, wherein the first mobile node includes one of:
    a mobile host; or
    a mobile router.

15. The device of claim 10, where the distribution protocol includes at least one of:
    a label distribution protocol; or
    a resource reservation protocol.

16. The device of claim 10, wherein the at least one networking parameter includes:
    an Internet Protocol (IP) address of the first mobile node.

17. The device of claim 10, further comprising:
    a forwarding module to:
        route communication messages from a second mobile node via the MPLS network, to the first mobile node, based on a label switched path that is established by the propagation of the mobility label and the distribution of the mobility label.

18. A method comprising:
    receiving, at a mobility support function (MSF) logic-enabled first edge router in a network including a plurality of label switch (LS) routers, a discovery signal from a first mobile node;
    registering, at the first edge router, the first mobile node, including storing first data identifying the first mobile node;
    assigning, by the first edge router, a first mobility label to the first mobile node after the registration, wherein the first mobility label identifies the first mobile node;
    distributing, in a multi-protocol label switching (MPLS) network portion within the network and in accordance with a multi-protocol border gateway protocol, messages describing the first mobility label and the first data, to a plurality of edge routers including an MSF logic-enabled second edge router, in the network, to create a first label switched path (LSP); and
    routing communication messages from a remote to be exchanged between the first mobile node and a second mobile node attached to the second edge router, along the first LSP in the MPLS network.

* * * * *